United States Patent [19]

Tabayashi

[11] Patent Number: 4,659,050
[45] Date of Patent: Apr. 21, 1987

[54] ROTARY SUPPORT DEVICE

[75] Inventor: Yoshikazu Tabayashi, Suita, Japan

[73] Assignee: Osaka Taiyo Co., Ltd., Osaka, Japan

[21] Appl. No.: 671,350

[22] Filed: Nov. 14, 1984

[30] Foreign Application Priority Data

Feb. 23, 1984 [JP] Japan .............................. 59-26138[U]
Mar. 10, 1984 [JP] Japan .............................. 59-34632[U]
Jun. 29, 1984 [JP] Japan .............................. 59-99184[U]

[51] Int. Cl.⁴ ............................................ A47B 91/00
[52] U.S. Cl. ...................................... 248/349; 248/131
[58] Field of Search .............. 248/349, 359, 425, 415,
248/418, 131, 183, 186; 108/139; 384/614, 615,
573, 523, 579

[56] References Cited

U.S. PATENT DOCUMENTS

| 2,545,122 | 3/1951 | Thompson | 384/615 |
| 2,671,631 | 3/1954 | Fox | 248/349 |
| 3,004,571 | 10/1961 | Gerbrandt | 108/139 |
| 3,302,594 | 2/1967 | Barnett | 248/349 |
| 4,239,304 | 12/1980 | Wakunami | 384/573 |
| 4,267,913 | 5/1981 | Ernst | 384/615 |

FOREIGN PATENT DOCUMENTS

| 18879 | 1/1882 | Fed. Rep. of Germany | 108/139 |
| 1316280 | 12/1962 | France . | |
| 1502893 | 10/1967 | France . | |
| 2494359 | 11/1981 | France . | |
| 845927 | 10/1952 | Italy | 248/349 |
| 157892 | 12/1932 | Switzerland | 108/139 |
| 245448 | 1/1947 | Switzerland | 248/349 |
| 467624 | 6/1937 | United Kingdom . | |

Primary Examiner—Reinaldo P. Machado
Assistant Examiner—Alvin Chin-Shue
Attorney, Agent, or Firm—Armstrong, Nikaido, Marmelstein & Kubovcik

[57] ABSTRACT

A rotary support device comprises an annular upper member and an annular under member which are so arranged that their inner or outer peripheral walls overlap each other with a small clearance formed therebetween. The overlapping peripheral walls are bent toward each other to form a pair of retaining portions which are rotatable relative to each other. A plurality of steel balls held spaced apart equidistantly by a retainer are rollably provided between the two members.

4 Claims, 13 Drawing Figures

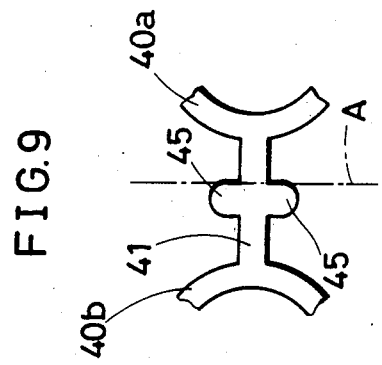
FIG. 9
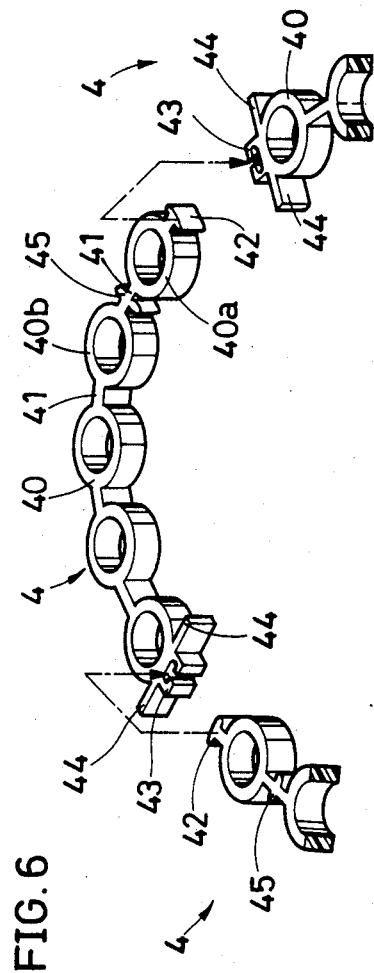
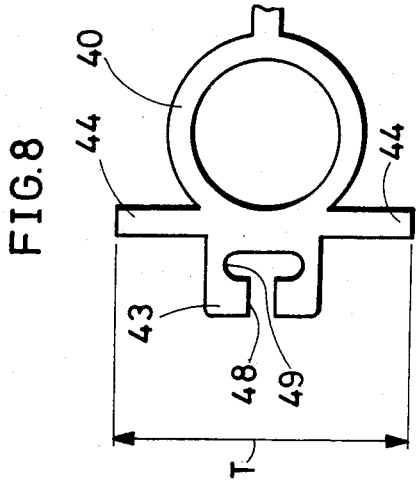
FIG. 8
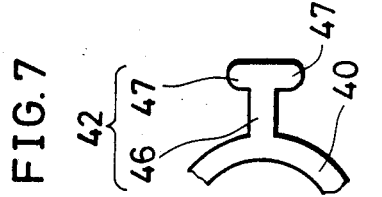
FIG. 7
FIG. 6

ROTARY SUPPORT DEVICE

BACKGROUND OF THE INVENTION

Devices for rotatably supporting articles have heretofore been proposed which comprise a base plate formed with an annular recessed portion and steel balls arranged on the recessed portion at a specified pitch so that the article can be rotatably supported by the steel balls, as disclosed in British Pat. No. 1,231,388 and Swiss Pat. No. 159,371. However, these devices, in which the article and the base plate are united, have the problem of being unsuited to universal use.

Accordingly the present applicant has already proposed a rotating apparatus which is universally usable and shown in FIG. 13. The apparatus is disclosed in detail in the specification of U.S. Pat. No. 4,433,954.

With reference to FIG. 13, the rotating apparatus comprises an under ring 81 serving as an under member, a plurality of roller bearings 8 mounted on the under ring 81 in vertical and horizontal positions, an upper ring 80 supported by the bearings and serving as an upper member, and a retaining member 82 for holding the two rings together. The apparatus is annular in its entirety and can be transported by rolling. Moreover, when a pallet is placed on the upper ring 80, a heavy article such as a drum can be rotatably supported by the apparatus. However, the apparatus, which includes the plurality of roller bearings, has a problem in respect of cost because the bearings and the retaining member 82 must be fixed to the rings by an expensive manual procedure.

SUMMARY OF THE INVENTION

According to the present invention, the inner peripheries or outer peripheries of an annular upper member and an annular under member are bent toward each other to form a lap, and the lapping peripheral edges are bent toward each other to thereby form a pair of retaining portions which are rotatable relative to each other. A plurality of steel balls held equidistantly spaced apart by a retainer are rollably arranged between the two members.

BRIEF DESCRIPTION OF THE DRAWINGS

FIG. 6 is a perspective view showing a retainer;

FIG. 7 is a plan view showing an engaging piece of the retainer;

FIG. 8 is a plan view showing a socket piece of the retainer;

FIG. 9 is a plan view showing a retainer connecting portion having protrusions;

DETAILED DESCRIPTION OF THE INVENTION

Figure 1:
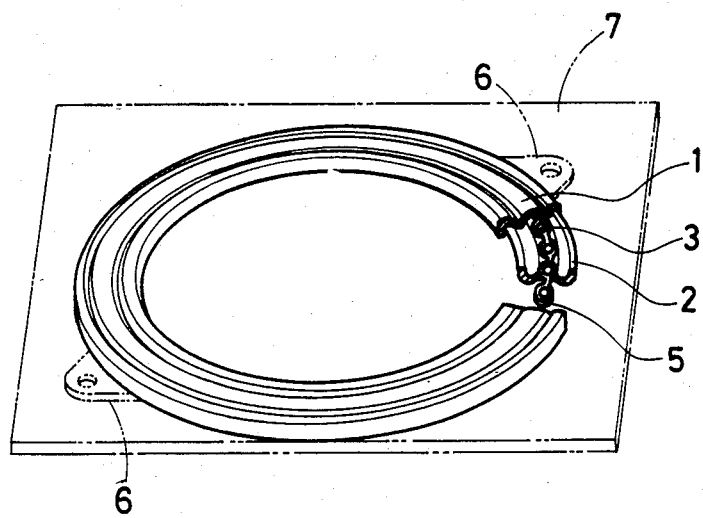
FIG. 1 is a perspective view partly broken away and showing a rotary support device.

FIG. 1 shows a rotary support device of the present invention supporting a table 7 for placing an article thereon.

A plurality of steel balls 3 are arranged at a definite spacing between an upper ring 1 and an under ring 2 which serve as an annular upper member and an annular under member, respectively. Interposed between the two rings is a retainer 5 for rollably holding these steel balls 3 at a definite position relative to the retainer. The two rings 1, 2 comprise annular horizontal walls 15, 25 formed with annular recessed portions 12, 22 for guiding the rolling movement of the steel balls 3, and vertical inner peripheral walls 11, 21 and vertical outer peripheral walls 10, 20 respectively bent at the inner and outer peripheries of the horizontal walls and each extending toward the opposed ring. The inner peripheral walls 11, 21, as well as the outer peripheral walls 10, 20, of the two rings 1, 2 lap over each other with a small clearance formed therebetween. Each of the inner peripheral walls 11, 21 and/or the outer peripheral walls 10, 20 is bent at its edge portion toward the other opposed lapping peripheral wall in a direction to engage therewith to thereby form a pair of annular retaining portions 13, 23 each positioned inwardly of the opposed peripheral wall beyond the extremity thereof by a small dimension t.

According to the present embodiment, each of the upper ring 1 and the under ring 2 is formed by blanking out a ring from a cold-rolled steel sheet having a thickness of 2.3 mm and pressing the blank. The device as assembled is 499 mm in outside diameter, 359 mm in inside diameter and about 20 mm in thickness. Forty-five steel balls 3, about 5.9 mm in diameter, are arranged at a pitch of about 28.2 mm and held by the retainer 5 in position relative to the retainer.

The vertical inner peripheral walls 11, 21 of the rings 1, 2 overlap each other as spaced apart by a clearance u of about 0.9 to 1.3 mm radially of the rings. The vertical outer peripheral walls 10, 20 are bent toward each other at a position 5 mm away from their extremities to overlap each other by the dimension t of about 1.4 to 2.0 mm radially of the rings.

Figure 2:
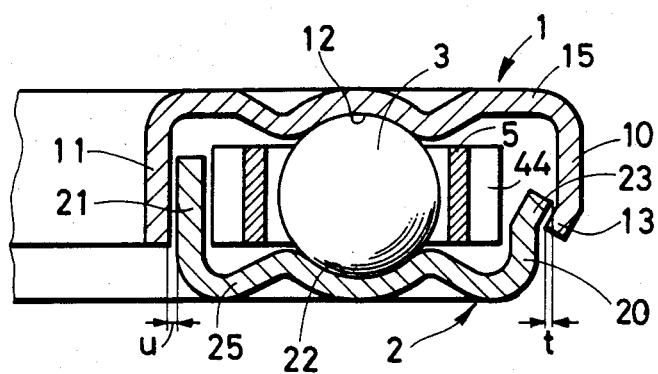
FIG. 2 is an enlarged sectional view of FIG. 1.
Figure 3:
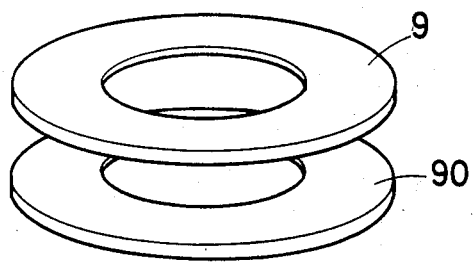
FIG. 3 is a perspective view showing steel plates before press work.
Figure 4:
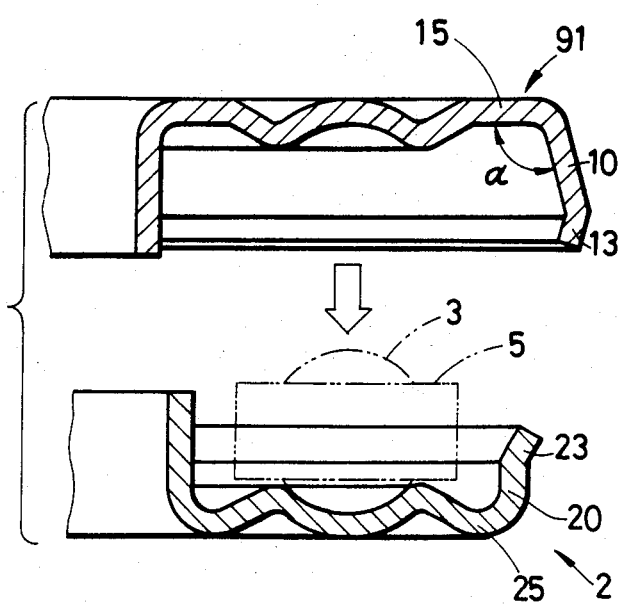
FIG. 4 is an enlarged sectional view showing an upper ring and an under ring before fitting.
Figure 5:
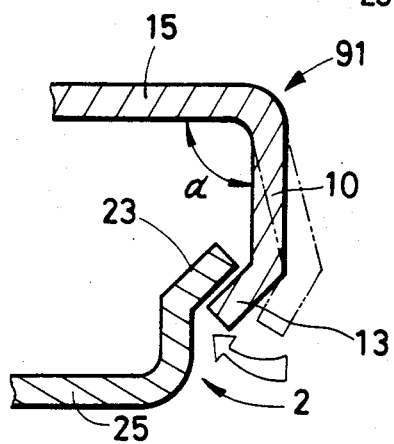
FIG. 5 is a diagram illustrating how to form retaining portions.

As seen in FIG. 3, the under ring 2 is prepared from a steel plate 90 blanked out in an annular form, by a single pressing process. To prepare the upper ring 1, on the other hand, a steel plate 9 blanked out in an annular form is subjected to a first pressing process to obtain a semi-finished ring 91 in which the horizontal wall 15 and the vertical outer peripheral wall 10 form an angle α of about 92 to 95 degrees as seen in FIG. 4. Subsequently the retainer 5 and steel balls 3 are arranged on the under ring 2, and the semi-finished upper ring 91 is placed over the resulting assembly as shown in FIG. 4. Since the retaining portion 13 of the semi-finished ring 91 has a larger diameter than the retaining portion 23 of the under ring 2, the semi-finished upper ring 91 is fittable over the under ring 2. The vertical outer peripheral wall 10 of the semi-finished ring 91 is then subjected over the entire circumference thereof to a second pressing process for plastic working to engage the retaining portions 13, 23 of the two rings with each other by reducing the angle α between the outer peripheral wall 10 and the horizontal wall 15 to about 90° as shown in FIG. 5, whereby the finished product of FIG. 2 is obtained.

Accordingly the upper ring 1 and the under ring 2 are freely rotatable relative to each other as supported by the steel balls, with a clearance u formed between their inner peripheral walls. However, since the retaining portions 13, 23 overlap each other radially of the rings over the entire circumference thereof, the two rings are prevented from separation by the retaining portions coming into contact with each other even when a separating force acts on the rings.

The retainer 5 comprises a plurality of retainer segments 4 connected to one another into a ring as seen in FIG. 6.

The retainer segment 4 is integrally molded of a synthetic resin and comprises a plurality of hollow cylindrical holding portions 40 arranged on a plane and interconnected in a row by flexible thin connecting portions 41. An engaging piece 42 and a socket piece 43 engageable with each other are provided at opposite ends of the segment 4 as shown in FIG. 6.

With reference to FIG. 7, the engaging piece 42 includes a thin plate-like stem 46 having the same thickness as the connecting portion 41 and protrusions 47 which are circular arc in section and provided on opposite sides of the forward end of the stem 46.

FIG. 8 shows that the socket piece 43 has a first socket 48 for the stem 46 of the engaging piece 42 to fit in and an enlarged second socket 49 for the protrusions 47 to fit in.

As seen in FIG. 9, the connecting portion 41 between a first holding portion 40a provided with the engaging piece 42 and a second holding portion 40b subsequent to the portion 40a is formed with protrusions 45 on its opposite sides. When the connecting portion 41 is cut along the broken line A shown, the remaining portion on the second holding portion 40b can be made to have the same shape as the engaging piece 42.

With reference to FIGS. 6 and 8, a pair of projections 44, 44 in the form of a thin plate extends from the base end of the socket piece 43 at right angles with the direction of arrangement of the holding portions 40. The end-to-end overall length T of the projections 44, 44 is slightly smaller than the distance between the inner surfaces of the under ring 2 shown in FIG. 2.

As shown in FIG. 6, the retainer segment 4 is arcuate in its entirety. Moreover, since the connecting portions 41 are made of a synthetic resin, the retainer segment 4 is further deformable. Accordingly the retainer 5 is formed by connecting a plurality of retainer segments 4 into a single elongated assembly by the engagement of engaging pieces 42 with socket pieces 43 and engaging the ends of the assembly with each other into a ring. The retainer 5 is interposed between the under ring 2 and the upper ring 1 and rollably holds the steel balls 3 at an equal spacing.

The diameter of the retainer 5 is adjustable in accordance with the sizes of the under ring 2 and the upper ring 1 by cutting the connecting portion 41 having the protrusions 45 and included in the retainer segment 4 and using the protrusions for engagement.

When the retainer 5 is provided between the under ring 2 and the upper ring 1, the projections 44, 44 formed at one end of each retainer segment 4 are opposed to the vertical inner peripheral wall 21 and the outer peripheral wall 20 of the under ring 2 in contact therewith or as spaced apart therefrom by a small clearance as shown in Fig. 2, whereby the retainer 5 interposed between the rings is prevented from displacement. Accordingly even when impact acts on the rotary support device radially of the rings for example when the device is carried around, the retainer 5 reliably holds the steel balls 3 arranged concentrically with the rings without permitting them to deviate from the circular raceways formed on the rings.

A table 7 is placed on the rotary support device as shown in FIG. 1. When a torque acts on the table 7, the upper ring 1 rotates smoothly relative to the under ring 2 owing to the rolling movement of the steel balls 3. Even if the load is applied to the upper ring 1 in a somewhat inclined direction relative to the center of rotation of the ring, the rings will not be displaced since the steel balls 3 are restrained by the annular recessed portions 12, 22 of the rings.

With the rotary support device, the retaining portions can be easily formed by press work at the edges of the upper ring and the under ring. This reduces the number of components and renders the device easy and inexpensive to make. Moreover, the device is annular in its entirety and is therefore convenient to carry around.

The retainer 5 can be formed from a synthetic resin easily, for example, by injection molding and is accordingly inexpensive to make. The diameter of the retainer 5 as an assembly is easily adjustable by changing the number of retainer segments 4 or by cutting the connecting portion 41 having the protrusions 45. Thus, the retainer 5 is well suited to the present device.

MODIFICATIONS OF THE INVENTION

Figure 10:
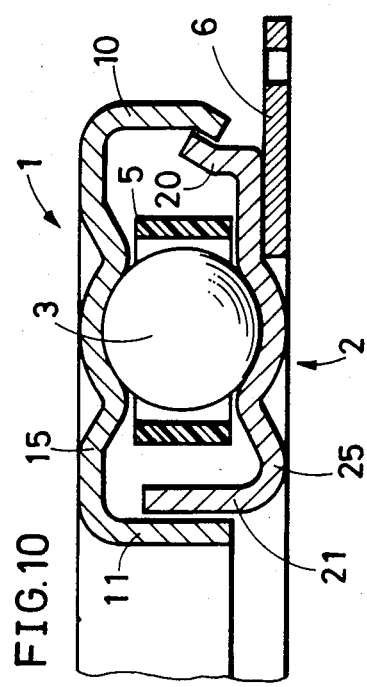
FIG. 10 is a sectional view showing a rotary support device having a flange on an under ring.
Figure 13:
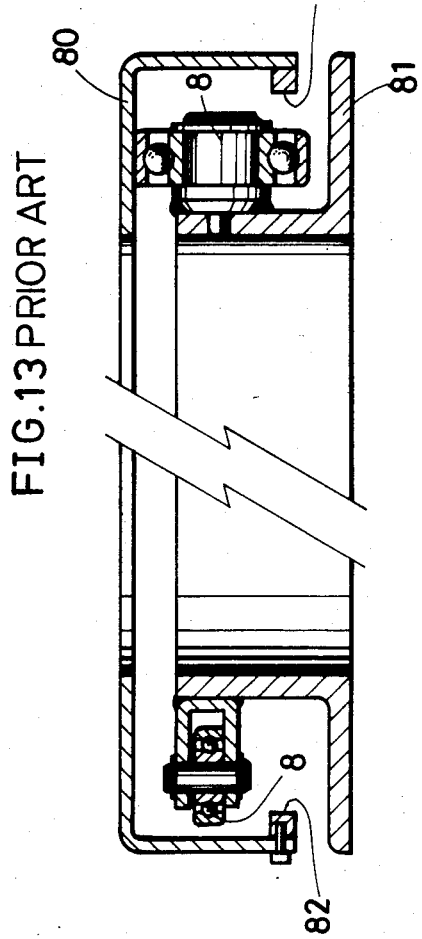
FIG. 13 is a sectional view showing a known rotating apparatus already proposed by the present inventor.

When required, outward or inward flanges 6 are attached to the upper ring 1 or the under ring 2 as seen in FIGS. 1 and 10. In this case, the flange attaching portion of the ring is recessed by an amount corresponding to the thickness of the flange as shown in FIG. 10, so that the lower surface of the device has no stepped portion.

Figure 11:
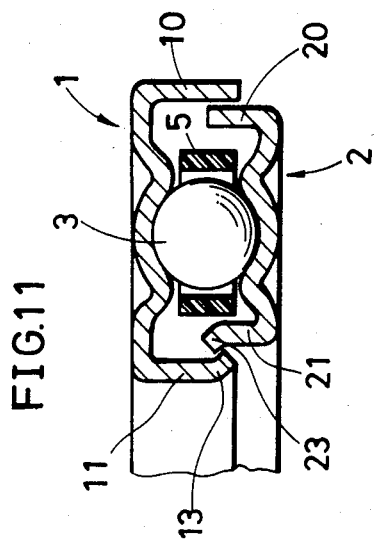
FIG. 11 is an enlarged sectional view showing another embodiment.

The retaining portions 13, 23, which are formed on the outer peripheral walls 10, 20 in the foregoing embodiment, may alternatively be formed on the inner peripheral walls 11, 21 as seen in FIG. 11.

According to the above embodiment, rings are blanked out from a steel sheet to obtain workpieces for press work, so that the disks blanked out for forming the central openings are unusable. However, the waste of steel sheet due to blanking can be reduced by blanking out sectors from a steel sheet, pressing the blanks and joining the pressed blanks into a ring by welding.

The raceways for the steel balls can be given improved resistance to abrasion and fatigue by subjecting the upper ring and the under ring to tufftriding treatment or plating the rings with hard chromium.

Although the engaging piece 42 and the socket piece 43 of the retainer segment 4 have the first protrusions 47 and the socket 49, respectively, for preventing slipping off, the engaging portions may be made separable in the direction of connecting retainer segments and bonded together with an adhesive when required for assembly, instead of forming the protrusions and socket. In this case, the second protrusions 45 need not be provided on the connecting portion 41.

The projections 44 of the retainer segment 4 need not always be formed on the socket piece 43 but can of course be provided on the holding portion 40 or the connecting portion 41.

Although the projections 44 are not always necessary, it is desirable to provide these projections to assure more reliable operation of the device.

Furthermore, when there is no need to adjust the diameter of the retainer, the second protrusions 45 need not be formed on the retainer segment 4, while the retainer can be molded as an integral piece in its entirety.

Because the retainer segment 4 is deformable at the connecting portions 41, it is not always necessary to form the segment in an arcuate shape in its entirety.

The under ring 2 and the upper ring 1 are not always in a fixed upper-lower relationship; the upper ring 1 of the rotary support device is of course usable as the under ring.

Figure 12:
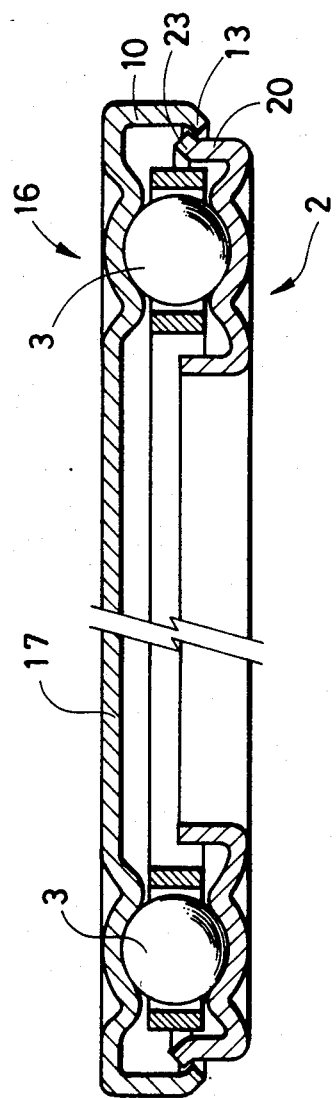
FIG. 12 is an enlarged sectional view showing an embodiment wherein an upper member is formed with a top wall.

One or both of the upper and under member can be of a shape other than a ring having a central opening. FIG. 12, for example, shows a disk-like member 16 having a top wall 17 at its central portion and serving as the upper member. Like the annular upper member already described, the member 16 can be formed from a steel sheet by press work. An article can be placed directly at the center of the upper member thus formed without using any table.

What is claimed is:

1. A rotary support device comprising an upper member in the form of a ring and an upper member in the form of a ring disposed below the upper member and inseparably therefrom, the upper member being supported by the under member rotatably relative thereto, steel balls being interposed between the upper member and the under member and being rotatably held spaced apart approximately equidistantly by a retainer, vertical inner peripheral walls and vertical outer peripheral walls being formed by respectively bending at the inner and outer peripheries of the horizontal walls of the upper and lower members each toward the other opposed member, one of the sets of inner peripheral walls and outer peripheral walls of the two members lapping over each other with a small clearance formed therebetween and the other of the two sets of inner and outer peripheral walls having its extremities each bent through an angle smaller than 90 degrees toward the other opposed lapping peripheral wall in a direction to engage therewith to form annular retaining portions each positioned inwardly of the opposed peripheral wall beyond the extremity thereof by a small dimension, the retainer comprising a plurality of retainer segments connected to one another into a ring, each of the retainer segments being integrally molded from a synthetic resin and comprising a plurality of hollow cylindrical holding portions with open-ended faces arranged on a plane, flexible connecting portions interposed between the holding portions and interconnecting the holding portions in a row, and an engaging piece projecting form the holding portion at one end of the row, the engaging piece having a stem projecting from the end holding portion and having the same shape as the connecting portion, and the stem being provided with a protrusion on each side of its forward end, a socket piece projecting from the holding portion at the other end of the row for the engaging piece to fit in, and the connecting portion between the end holding portion and another holding portion adjacent thereto being provided on each side thereof with a second protrusion having the same shape as the protrusion.

2. A rotary support device as defined in claim 1 wherein the inner peripheral walls of the upper ring and the under ring are formed with the retaining portions, respectively.

3. A rotary support device as defined in claim 1 wherein the outer peripheral walls of the upper ring and the under ring are formed with the retaining portions, respectively.

4. A rotary support device as defined in claim 1 wherein the retainer segment is provided on at least one of its inner and outer opposite sides with a projection having a free end projecting outward from the retainer segment.

* * * * *

UNITED STATES PATENT AND TRADEMARK OFFICE
CERTIFICATE OF CORRECTION

PATENT NO. : 4,659,050
DATED : April 21, 1987
INVENTOR(S) : YOSHIKAZU TABAYASHI

It is certified that error appears in the above-identified patent and that said Letters Patent is hereby corrected as shown below:

On the cover page, Item [73], change "Taiyo" to --- Taiyu ---.

Signed and Sealed this

Eleventh Day of August, 1987

Attest:

DONALD J. QUIGG

Attesting Officer

Commissioner of Patents and Trademarks